United States Patent [19]
Feigin et al.

[11] Patent Number: 6,006,196
[45] Date of Patent: Dec. 21, 1999

[54] METHOD OF ESTIMATING FUTURE REPLENISHMENT REQUIREMENTS AND INVENTORY LEVELS IN PHYSICAL DISTRIBUTION NETWORKS

[75] Inventors: Gerald E. Feigin, Scarborough; Kaan Kudsi Katircioglu, Peekskill; David Da-Wei Yao, Yorktown Heights, all of N.Y.

[73] Assignee: International Business Machines Corporation, Armonk, N.Y.

[21] Appl. No.: 08/848,073

[22] Filed: May 1, 1997

[51] Int. Cl.$^6$ ........................................ G06F 17/60
[52] U.S. Cl. ................................. 705/10; 705/28
[58] Field of Search ................... 705/10, 22, 28, 705/8

[56] References Cited

U.S. PATENT DOCUMENTS 5,819,232  10/1998  Shipman ........................................ 705/8

OTHER PUBLICATIONS

Martin, Andre. "Communicating Time–phased Requirements to Suppliers Significantly Reduces Cost, Changes Business Methods." Indusrial Engineering, v. 20, n. 11, pp. 60–63, Nov. 1988.

Bookbinder, James and Donald Heath. "Replenishment Analysis in Distribution Requirements Planning." Decision Sciences, v. 19, n. 3, 1988.

Bookbinder, James H. and Donald B. Heath. "Replenishment Analysis in Distribution Requirements Planning." Decision Sciences, v. 19, n. 3, pp. 477–489, 1988.

"MRP/DRP Aids Dow Chemical." Production & Inventory Management Review & APICS News, v. 8, n. 11, pp. 33–34, Nov. 1988.

Prince, Tyler and Scott Kaufman. "From Order to Loading Dock." InformationWeek, n. 554, p. 96(4), Nov. 1995.

Wasik, Arthur. "Logistics Information Systems: the Information of an Enterprise Perspective." Logistics Information Management, v. 5, n. 1, pp. 18–21, 1992.

Masters, James M. "Determination of Near Optimal Stock Levels for Multi–Echelon Distribution Inventories." Journal of Business Logistics, v. 14, n. 2, pp. 165–195, 1993.

Yanacek, Frank. "Improving Inventory Control–Management." Transportation & Distribution, v. 28, p. 46(3), Oct. 1987.

Bregman, Robert et al. "A Heuristic Algorithm for Managing Inventory in a Multi–Echelon Environment." Journal of Operations Management, v. 8, n. 3, pp. 186–208, Aug. 1989.

Cheng, Dinah W. and David D. Yao. "Tandem Queues with General Blocking." Discrete Event Dynamic Systems: Theory and Applications 2, pp. 207–234, 1993.

Sigma, Karl and David D. Yao. "Finite Moments for Inventory Processes." Proceedings of the Annual Conference on Communication Control and Computing, v. 31, pp. 423–432, 1993.

Glasserman, Paul and David D. Yao. "Structured Buffer–allocation Problems." Discrete Event Dynamic Systems: Theory and Applications, v. 6, n. 1, pp. 9–41, 1996.

Katircioglu, Kaan K. "Essays in Inventory Control." University of British Columbia, PhD Dissertation, 1996.

Primary Examiner—Allen R. MacDonald
Assistant Examiner—Michele Stuckey Crecca
Attorney, Agent, or Firm—McGinn & Gibb, P.C.; Stephen C. Kaufman, Esq.

[57] ABSTRACT

A method suitable for use in a physical distribution network. The method comprises the steps of using a distribution resource planning (DRP) logic for providing estimates of at least one of projected future on-hand inventory and replenishment requirements; and, incorporating within the DRP logic an uncertainty of future demand for estimating at least one of future replenishment requirements and inventory levels in the physical distribution network.

19 Claims, 7 Drawing Sheets

Layout of distribution network example

Layout of distribution network example

Planning Parameters

| Order Quantity | 30 |
|---|---|
| Lead Time | 5 |
| Safety Stock | 10 |

12

Retailer #1

| Period | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Demand | | 10 | 10 | 10 | 10 | 10 | 10 | 10 | 10 | 10 | 10 | 10 | 10 | 10 | 10 | 10 | 10 |
| Scheduled Receipts | | 0 | 0 | 0 | 0 | 0 | 0 | 0 | 0 | 0 | 0 | 0 | 0 | 0 | 0 | 0 | 0 |
| Safety Stock | | 10 | 10 | 10 | 10 | 10 | 10 | 10 | 10 | 10 | 10 | 10 | 10 | 10 | 10 | 10 | 10 |
| On-Hand (pd end) | 60 | 50 | 40 | 30 | 20 | 10 | 30 | 20 | 10 | 30 | 20 | 10 | 30 | 20 | 10 | 30 | 20 |
| Requirements | | 0 | 0 | 0 | 0 | 0 | 10 | 0 | 0 | 10 | 0 | 0 | 10 | 0 | 0 | 10 | 0 |
| Planned Receipts | | 0 | 0 | 0 | 0 | 0 | 30 | 0 | 0 | 30 | 0 | 0 | 30 | 0 | 0 | 30 | 0 |
| Backorders | | 0 | 0 | 0 | 0 | 0 | 0 | 0 | 0 | 0 | 0 | 0 | 0 | 0 | 0 | 0 | 0 |
| Rec. Orders | | 30 | 0 | 0 | 30 | 0 | 0 | 30 | 0 | 0 | 30 | 0 | 0 | 30 | 0 | 0 | 30 |

Table 1: Sample DRP Table for one retail location

Fig. 2

| Planning Parameters | |
|---|---|
| Order Quantity | 200 |
| Lead Time | 15 |
| Safety Stock | 15 |

Warehouse

| Period | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Demand | | 90 | 0 | 0 | 90 | 0 | 0 | 90 | 0 | 0 | 90 | 0 | 0 | 90 | 0 | 0 | 90 |
| Scheduled Receipts | | 0 | 0 | 0 | 0 | 0 | 0 | 0 | 0 | 0 | 0 | 0 | 0 | 0 | 0 | 0 | 0 |
| Safety Stock | | 15 | 15 | 15 | 15 | 15 | 15 | 15 | 15 | 15 | 15 | 15 | 15 | 15 | 15 | 15 | 15 |
| On-Hand (pd end) | 200 | 110 | 110 | 110 | 20 | 20 | 20 | 0 | 0 | 0 | 0 | 0 | 0 | 0 | 0 | 0 | 0 |
| Requirements | | 0 | 0 | 0 | 0 | 0 | 0 | 85 | 85 | 85 | 175 | 175 | 175 | 265 | 265 | 265 | 355 |
| Planned Receipts | | 0 | 0 | 0 | 0 | 0 | 0 | 0 | 0 | 0 | 0 | 0 | 0 | 0 | 0 | 0 | 0 |
| Backorders | | 0 | 0 | 0 | 0 | 0 | 0 | 70 | 70 | 70 | 160 | 160 | 160 | 250 | 250 | 250 | 140 |
| Rec. Orders | | 200 | 200 | 0 | 200 | 0 | 0 | 0 | 0 | 0 | 200 | 0 | 0 | 0 | 0 | 0 | 200 |

Table 2: Sample DRP Table for warehouse

Planning Parameters

| Order Rate | Lot-for-lot |
|---|---|
| Lead Time | 5 |
| Safety Stock | 5 |

DRP Table For Retailer - Standard DRP

| Period | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Demand | | 10 | 10 | 10 | 10 | 10 | 10 | 10 | 10 | 10 | 10 | 10 | 10 | 10 | 10 | 10 | 10 |
| Scheduled Receipts | | 0 | 0 | 0 | 0 | 0 | 0 | 0 | 0 | 0 | 0 | 0 | 0 | 0 | 0 | 0 | 0 |
| Safety Stock | | 5 | 5 | 5 | 5 | 5 | 5 | 5 | 5 | 5 | 5 | 5 | 5 | 5 | 5 | 5 | 5 |
| On-Hand (pd end) | 60 | 50 | 40 | 30 | 20 | 10 | 5 | 5 | 5 | 5 | 5 | 5 | 5 | 5 | 5 | 5 | 5 |
| Requirements | | 0 | 0 | 0 | 0 | 0 | 5 | 10 | 10 | 10 | 10 | 10 | 10 | 10 | 10 | 10 | 10 |
| Planned Receipts | | 0 | 0 | 0 | 0 | 0 | 5 | 10 | 10 | 10 | 10 | 10 | 10 | 10 | 10 | 10 | 10 |
| Backorders | | 0 | 0 | 0 | 0 | 0 | 0 | 0 | 0 | 0 | 0 | 0 | 0 | 0 | 0 | 0 | 0 |
| Rec. Orders | | 5 | 10 | 10 | 10 | 10 | 10 | 10 | 10 | 10 | 10 | 10 | 10 | 10 | 10 | 10 | 10 |

DRP Table For Retailer - Method 1

| Period | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Demand | | 10 | 10 | 10 | 10 | 10 | 10 | 10 | 10 | 10 | 10 | 10 | 10 | 10 | 10 | 10 | 10 |
| Scheduled Receipts | | 0 | 0 | 0 | 0 | 0 | 0 | 0 | 0 | 0 | 0 | 0 | 0 | 0 | 0 | 0 | 0 |
| Safety Stock | | 5 | 5 | 5 | 5 | 5 | 5 | 5 | 5 | 5 | 5 | 5 | 5 | 5 | 5 | 5 | 5 |
| On-Hand (pd end) | 60 | 50 | 40 | 30 | 20 | 12 | 9 | 9 | 9 | 9 | 9 | 9 | 9 | 9 | 9 | 9 | 9 |
| Requirements | | 0 | 0 | 0 | 0 | 0 | 5 | 10 | 10 | 10 | 10 | 10 | 10 | 10 | 10 | 10 | 10 |
| Planned Receipts | | 0 | 0 | 0 | 0 | 0 | 5 | 10 | 10 | 10 | 10 | 10 | 10 | 10 | 10 | 10 | 10 |
| Backorders | | 0 | 0 | 0 | 0 | 2 | 4 | 4 | 4 | 4 | 4 | 4 | 4 | 4 | 4 | 4 | 4 |
| Rec. Orders | | 5 | 10 | 10 | 10 | 10 | 10 | 10 | 10 | 10 | 10 | 10 | 10 | 10 | 10 | 10 | 10 |

Table 3: Comparison of Standard DRP and Method 1

Fig. 4

Estimates of Week 10 On-Hand Inventory as Function of Safety Stock

Planning Parameters

| Order Quantity | 30 |
|---|---|
| Lead Time | 5 |
| Safety Stock | 5 |

DRP Table For Retailer - Standard DRP

| Period | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Demand | | 10 | 10 | 10 | 10 | 10 | 10 | 10 | 10 | 10 | 10 | 10 | 10 | 10 | 10 | 10 | 10 |
| Scheduled Receipts | | 0 | 0 | 0 | 0 | 0 | 0 | 0 | 0 | 0 | 0 | 0 | 0 | 0 | 0 | 0 | 0 |
| Safety Stock | | 5 | 5 | 5 | 5 | 5 | 5 | 5 | 5 | 5 | 5 | 5 | 5 | 5 | 5 | 5 | 5 |
| On-Hand (pd end) | 60 | 50 | 40 | 30 | 20 | 10 | 30 | 20 | 10 | 30 | 20 | 10 | 30 | 20 | 10 | 30 | 20 |
| Requirements | | 0 | 0 | 0 | 0 | 0 | 5 | 0 | 0 | 5 | 0 | 0 | 5 | 0 | 0 | 5 | 0 |
| Planned Receipts | | 0 | 0 | 0 | 0 | 0 | 30 | 0 | 0 | 30 | 0 | 0 | 30 | 0 | 0 | 30 | 0 |
| Backorders | | 0 | 0 | 0 | 0 | 0 | 0 | 0 | 0 | 0 | 0 | 0 | 0 | 0 | 0 | 0 | 0 |
| Rec. Orders | 30 | 0 | 0 | 0 | 0 | 0 | 0 | 30 | 0 | 0 | 30 | 0 | 0 | 30 | 0 | 0 | 0 |

DRP Table for Retailer - Method 2

| Period | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Demand | | 10 | 10 | 10 | 10 | 10 | 10 | 10 | 10 | 10 | 10 | 10 | 10 | 10 | 10 | 10 | 10 |
| Scheduled Receipts | | 0 | 0 | 0 | 0 | 0 | 0 | 0 | 0 | 0 | 0 | 0 | 0 | 0 | 0 | 0 | 0 |
| Safety Stock | | 5 | 5 | 5 | 5 | 5 | 5 | 5 | 5 | 5 | 5 | 5 | 5 | 5 | 5 | 5 | 5 |
| On-Hand (pd end) | 60 | 50.0 | 40.0 | 30.0 | 20.0 | 11.8 | 18.2 | 19.9 | 19.4 | 19.5 | 19.5 | 19.5 | 19.5 | 19.4 | 19.3 | 19.3 | 19.8 |
| Requirements | | 0 | 0 | 0 | 0.5 | 3.2 | 8.6 | 3.1 | 2.4 | 2.6 | 2.3 | 2.6 | 2.3 | 2.5 | 2.4 | 2.5 | 2.5 |
| Planned Receipts | | 0 | 0 | 0 | 0 | 0 | 18.1 | 11.1 | 9.5 | 10.1 | 9.6 | 10.8 | 9.5 | 10.0 | 9.9 | 10.0 | 10.5 |
| Backorders | | 0 | 0 | 0 | 0.2 | 1.8 | 0.1 | 0.0 | 0.0 | 0.0 | 0.0 | 0.0 | 0.0 | 0.0 | 0.0 | 0.0 | 0.0 |
| Rec. Orders | 18.1 | 11.8 | 9.5 | 10.1 | 9.6 | 10.8 | 9.5 | 10.0 | 9.9 | 10.0 | 10.5 | 9.9 | 9.5 | 9.9 | 9.7 | 9.8 | 10.5 |

Table 4: Comparison of Standard DRP and Method 2

Fig. 6

METHOD OF ESTIMATING FUTURE REPLENISHMENT REQUIREMENTS AND INVENTORY LEVELS IN PHYSICAL DISTRIBUTION NETWORKS

FIELD OF THE INVENTION

This invention relates to the management of inventory in physical distribution networks. Specifically, the invention relates to a distribution logistics framework known as Distribution Resource Planning (DRP), widely used in industry to manage the flow of goods through such networks. The inveniton focuses on the problem of projection (or, equivalently, estimation) of future distribution requirements and of future inventory levels and discloses preferred methods for enhancing the capability of DRP in this regard.

INTRODUCTION TO THE INVENTION

Problem Definition
Overview

A physical distribution system consists of a collection of warehouses, distribution centers, and retailers through which products flow on their way from manufacturer to final customer. Management of inventory in such networks entails deciding how much inventory of each product to stock at each location in the network, when and how to replenish these stocks, and how large the replenishment order quantities should be. Distribution Resource Planning (DRP) refers to a general framework for planning and managing inventory in distribution systems. In particular, it allows for the setting of inventory control parameters and the calculation of time-phased inventory requirements, based on user-specified goals, such as service level targets or total inventory investment. It can take into consideration a host of different constraints, including supply capacity constraints, minimum and maximum order quantity constraints, etc. Since the early 1980's, DRP systems have been implemented in a variety of commercial software packages, offering a wide range of decision support capabilities to inventory managers and procurement personnel, and have been widely used in industry. For descriptions of DRP as well as examples of how it is used, refer to Martin, Silver and Peterson, Stenger, Mlot et al., and Smith. (Martin, A. J., *Distribution Resource Planning: Distribution Management's Most Powerful Tool*, Prentice-Hall, Englewood Cliffs, N.J. and Oliver Wight Ltd. Publications, Inc., Essex Junction, Vt., 2nd ed., 1990; Silver, E. A. and Peterson, R., *Decision Systems for Inventory Management and Production Planning*, Wiley, New York, 2nd ed., 1985; Stenger, A. J., Distribution Resource Planning in: *The Logistics Handbook*, J. F. Robeson and W. C. Copacino (eds.), The Free Press, New York, 1994; Mlot, B., DiFrancesco, L., Perry, D., Landvater, D. and Martin, A., Distribution Resource Planning: The Critical Link from Final Point of Manufacture to Final Point of Sale, *The 39th APICS International Conference Proceedings*, 1996, pp. 294–297). Examples of popular software packages that implement DRP include those sold by Manugistics Inc., American Software, i2, and LPA.

SUMMARY OF THE INVENTION

One of the advertised strengths of DRP is its putative ability to project future on-hand inventory and future replenishment requirements at all echelons of a distribution network. Indeed, Stenger states that "the projection plan represented by any one [DRP] table is of great value in its own right because it shows the inventory levels we need to maintain to meet demand and provide customers with the service needed (through the safety stock). It also indicates when replenishments—and their quantities—need to be scheduled to make the plan work." The projection of future on-hand inventory and replenishment requirements is accomplished using standard DRP logic, described below. However, as we explain below, standard DRP logic provides estimates of projected future on-hand inventory and replenishment requirements without taking into consideration the uncertainty of future demands. Specifically, DRP logic, in its calculation of projected on-hand inventory and replenishment requirements, implicitly assumes that the demand that will be realized in the future is exactly equal to the forecast. We provide a simple example which demonstrates that the standard DRP logic, by ignoring future demand variability, can lead to misleading performance estimates. This invention, in sharp contrast to the prior art, discloses two methods for enhancing DRP's performance projection capabilities by making explicit use of future demand variability information, one preferably based on an analytical approximation and one preferably based on Monte Carlo simulation.

Accordingly, in a first aspect, the invention discloses a program storage device readable by a machine, tangibly embodying a program of instructions executable by the machine to perform method steps for use in a physical distribution network, the method comprising the steps of:

(1) using a distribution resource planning (DRP) logic for providing estimates of at least one of projected future on-hand inventory and replenishment requirements; and (2) incorporating within the DRP logic an uncertainty of future demand for estimating at least one of future replenishment requirements and inventory levels in the physical distribution network.

In a second aspect, the invention comprises a distribution resource planning engine comprising:

(1) an input means for inputting to the engine information derived from a database, a forecast engine, and an inventory planning engine and comprising respectively inventory status, planning parameters, and demand forecasts;

(2) a logic means connectable to the input means and operable upon its information and comprising a distribution resource planning agent incorporating an uncertainty of future demand for estimating at least one of future replenishment requirements and inventory levels in a physical distribution network; and (3) an output means connected to the logic means for outputting estimates of at least one of future replenishment requirements and inventory levels in a physical distribution network.

The invention as defined can realize important advantages. For example, it enables one to retain all the virtues of extant DRP logic, while it removes its current noted deficiencies with respect to implicit assumption (i.e., that a demand that will be realized in the future is presumably to be exactly equal to a forecast). In this way, the invention can realize the significant advantage of enhancing DRP performance projection capabilities.

BRIEF DESCRIPTION OF THE DRAWINGS

The invention is illustrated in the accompanying drawing, in which:

FIGS. 2–4 and 6 comprise Tables of utility in explaining the invention;

DETAILED DESCRIPTION OF THE INVENTION

Formal Description of DRP Logic

Figure 1:
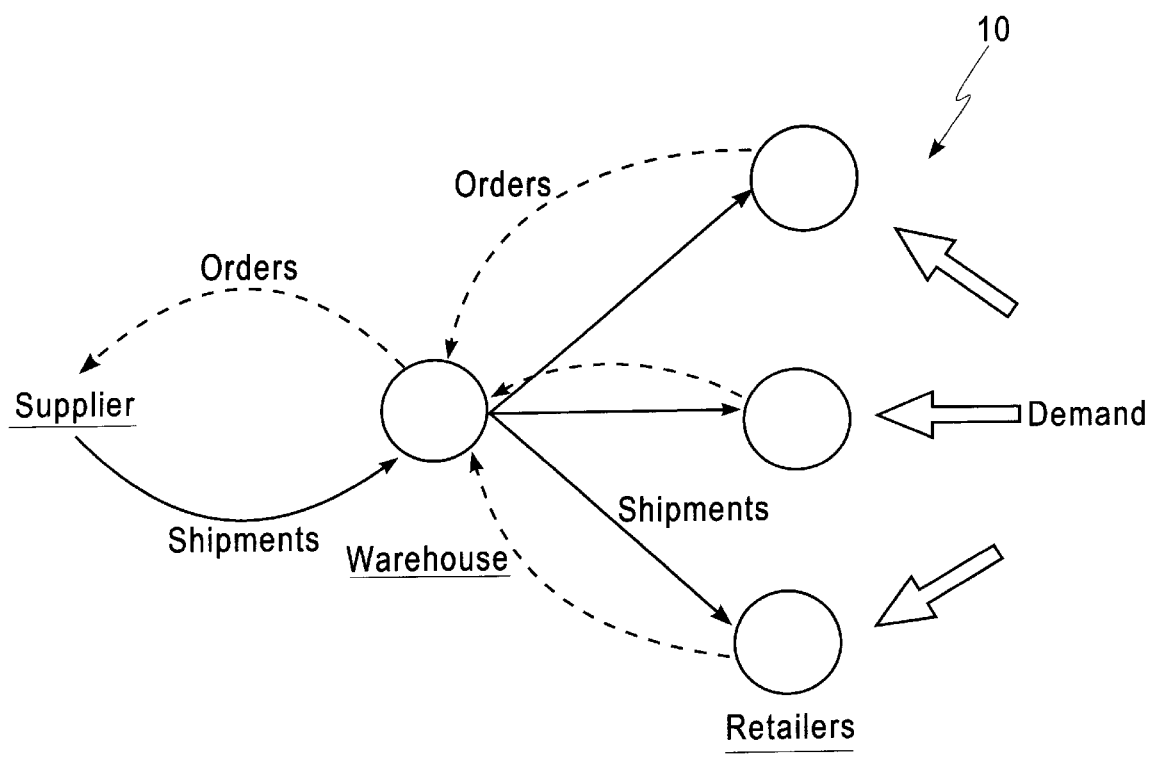
FIG. 1 shows a layout of a distribution network.

By DRP logic, we mean a mathematical algorithm used in standard DRP procedures to calculate future on-hand inventory and future replenishment requirements. We begin with a mathematical description of DRP logic. Our description is a formal abstraction from standard DRP procedures, descriptions of which are widely available in professional references such as Stenger, as well as in manuals of commercial software, such as those mentioned above. We explain the logic in terms of a single product at a single location; later, we provide an example illustrating how the logic carries over to distribution networks with multiple locations and multiple products.

DRP logic is based on a set of recursive equations that characterize the inventory dynamics over time. To be more precise, the principal logic of DRP involves the recursive calculation of the replenishment requirements, the on-hand inventory, and the backordered demand in the future for a specific product at a specific location. The first step in describing the recursion is to divide the future time into a set of discrete periods of equal length, indexed by t=1,2, ... ,n, where n is the time horizon of interest. As a practical matter, DRP logic is typically implemented using weekly or monthly periods with a time horizon of 6 months to one year. So, assuming that we are currently at the beginning of period 1 (equivalently, the end of period 0) the objective of DRP logic is to project, for the product and location of interest, the following quantities for all future periods, t, t=1,2, ... ,n:

$I_t$: the on-hand inventory at the end of time period t.

$B_t$:=the backordered demand at the end of time period t.

$A_t$:=the required quantity of product needed at the beginning of period t.

$Q_t$:=the planned receipts of product needed at the beginning of period t.

$R_t$:=the recommended order quantity at the beginning of period t.

The distinction between the requirements, $A_t$, and the planned receipts, $Q_t$, is important. Whereas $A_t$ represents the quantity that is needed at the beginning of period t, $Q_t$ reflects what is feasible, taking into account lead time constraints and order quantity restrictions. For example, if $A_t$=40 and the maximum order quantity is 30, then $Q_t$ would be set to 30.

To carry out the recursive calculation of these quantities, DRP assumes that the following information is known (again, for the specific product and location) at the start of time period 1:

$D_t$:=the demand in future time period t,t=1,2, ... ,n. Although the actual future demand is unknown, DRP assumes that the future demand in period t is known through its mean, $E[D_t]$, and standard deviation, $sd[D_t]$. (This information presumably comes from some forecasting procedure but how this information is generated is not relevant to DRP logic.)

$T_t$:=the scheduled receipts at the beginning of time period t. This is the quantity of the product that is currently (i.e., at the beginning of period 1) scheduled to arrive at the location at the start of period t.

$K_t$:=the safety stock requirement for period t. This is the quantity of the product that should be kept at this location in this period to protect against uncertainty in demand.

Most DRP software implementations provide a variety of methods to automatically calculate safety stock requirements for each period. These methods vary in degree of sophistication but, just as with forecast generation, the particular approach used is not relevant to DRP logic.

$I_0$:=the on-hand inventory at the beginning of time period 1. This is the current on-hand inventory.

$B_0$:=the backordered demand at the beginning of time period 1.

The scheduled receipts, $T_t$, should not be confused with the planned receipts, $Q_t$. The former is an input to DRP and reflects what is actually going to be delivered at the start of period t; the latter is an output of DRP and reflects an assessment of what is additionally needed at the start of period t. The scheduled receipts are sometimes referred to as "in-transit" to suggest that the goods are physically en route to the location in question.

To project future requirements, $A_t$, t=1, ... ,n, DRP makes use of the following recursive relation:

$$A_t = [B_{t-1} - I_{t-1} + T_t + D_t + K_t]^+ t=1, \ldots, n, \qquad (1)$$

where $[x]^+$ denotes max $\{x,0\}$. The above equation says that the replenishment requirement in each period along with any on-hand inventory from the last period and scheduled receipts due at the beginning of this period, should be able to supply the demand of the current period and any backlog from the last period, and still result in a surplus that is equal to the required safety stock for this period. The next step in DRP logic is to modify $A_t$ to reflect what can feasibly be obtained by the start of period t. To this end, the planned receipts, $Q_t$, are derived from $A_t$ by applying any set of order restrictions that have been prespecified. Mathematically, $$Q_t = f(A_t) t=1, \ldots, n, \qquad (2)$$

where $f$ is an arbitrary user-defined function which characterizes the replenishment order policy. Two commonly used replenishment order policies are lot-for-lot and min-max. In lot-for-lot, the function $f$ is the identity function and $Q_t = A_t$ t=1, ... ,n. That is, no restrictions are placed on order quantities. In min-max, minimum and maximum order quantities, $Q_{min}$ and $Q_{max}$, as are specified and the order policy rule is $$f_{min\ max} := \min(\max(Q_{min}, A_t), Q_{max}) t=1, \ldots,$$

That is, the order quantity is made to fall within the minimum and maximum order quantity range.

The recursive equations governing the on-hand inventory, $I_t$, and the backorders, $B_t$, are simple to describe as well. First, denote the net inventory level at the beginning of period t as $$Y_t = I_{t-1} - B_{t-1} + T_t, t=1, \ldots, n. \qquad (3)$$

Then, clearly, $$I_t = [Q_t + Y_t - D_t]^+, \text{ and } B_t = [D_t - Q_t - Y_t]^+ \qquad (4)$$

The final calculation performed by DRP is the recommended orders. Suppose that the order lead time for a specific product at a specific location is L weeks. In DRP, replenishment requirements translate to recommended order quantities L weeks earlier:

$$R_t = Q_{t+L}, t=1, \ldots, n-L \qquad (5)$$

So, the recommended order quantity at the start of period t is whatever the calculated planned receipts quantity is in period t+L.

Since the future demand $D_t$ is known only through its forecasted mean and standard deviation, to implement the recursions defined in (1)–(5), DRP logic uses the forecasted mean demand, $E[D_t]$, in place of $D_t$ to obtain the following modified recursions:

$$\tilde{A}_t = [\tilde{B}_{t-1} - \tilde{I}_{t-1} + T_t E[D_t] + K_t]^+, \, t=1, \ldots, n, \quad (6)$$

$$\tilde{Q}_t = f(\tilde{A}), \, t=1, \ldots, n, \quad (8)$$

$$\tilde{Y}_t = \tilde{I}_{t-1} - \tilde{B}_{t-1} + T_t, \, t=1, \ldots, n, \quad (8)$$

$$\tilde{I}_t = [\tilde{Q}_t + \tilde{Y}_t - E[D_t]]^+, \text{ and } \tilde{B}_t = [E[D_t] - \tilde{Q}_t - \tilde{Y}_t]^+, \quad (9)$$

$$\tilde{R}_t = \tilde{Q}_{t+L}, \, t=1, \ldots, n-L \quad (10)$$

We use the tilde ( ̃) to differentiate the formal recursions defined above from the DRP implementation of these recursions using the forecasted mean demand. Therefore, these quantities can be viewed as DRP's estimates of unknown future quantities. For example, $\tilde{R}_t$ can be interpreted as DRP's estimate of the quantity that will be ordered at the start of week t standing at the beginning of period 1. In particular, $\tilde{R}_1$ is the current recommended order quantity—i.e., it is the amount that, according to DRP, should be ordered right now. $\tilde{R}_5$ is DRP's current best guess at the quantity that is most likely to be ordered at the start of period 5.

EXAMPLE

To help illustrate DRP logic, we consider an extremely simple distribution network, illustrated schematically in FIG. 1, numeral 10. The network consists of three retailers supplied by one warehouse location. The retailers obtain replenishments from the warehouse, who in turn obtains replenishments from a supplier. For the purpose of this example, we focus on one product that is sold by all three retailers. We assume that the replenishment lead time for this product at each of the retailers is 5 weeks and that the replenishment lead time at the warehouse is 15 weeks. This means, for example, that if a retailer places a replenishment order at the start of week 1, then it will arrive at the start of week 6. Let us suppose that we are currently at the beginning of week 1 (i.e., t=1) and we are interested in using DRP to project forward 26 weeks into the future. DRP logic assumes that the following information is known at this time:

The mean and standard deviation of each retailer's future weekly demand over the horizon in question.

The current on-hand inventory at each location, namely at all three retailers and at the warehouse.

The scheduled receipts—i.e., a list of all shipments scheduled to arrive at each location by week over the horizon in question.

The safety stock to be held at each location.

For this example, we assume that the weekly demand at each retailer for this product follows a discrete uniform distribution on [0,20]—that is, the weekly demand equals n with probability p=1/21, n=0,1, . . . 20. Thus, the weekly demand at each retail location has a mean of 10 and a standard deviation of $\sqrt{110/3} \approx 6.06$. We also assume that at the start of week 1, we have 60 units of on-hand inventory available at each retailer and 100 units available at the warehouse. Next, let us suppose that there are currently no scheduled receipts. Finally, we assume that the retailers wish to hold 10 units of safety stock and the warehouse wishes to hold 15 units of safety stock.

To project on-hand inventory and replenishment requirements for the next 26 weeks at each location in this network, DRP logic first starts with the retail locations and constructs a table for each retailer that reflects the weekly operation of the retailer over the next 26 weeks. The table consists of 26 columns (one for each week) and the following rows:

1. Expected (i.e., mean) demand ($E[D_t]$)
2. Scheduled receipts ($T_t$)
3. Safety stock requirements ($K_t$)
4. Replenishment requirements ($\tilde{A}_t$)
5. Planned receipts ($\tilde{Q}_t$)
6. On-hand inventory ($\tilde{I}_t$)
7. Backordered demand ($\tilde{B}_t$)
8. Recommended orders ($\tilde{R}_t$)

FIG. 2, numeral 12, comprising Table 1 shows a completed DRP table for one retailer in our example. (Since all the retailers are identical in this example, the tables generated for the retailers are identical). All of the projected quantities, $\tilde{A}_t$, $\tilde{Q}_t$, $\tilde{I}_t$, $\tilde{B}_t$, and $\tilde{R}_t$, have been calculated using the recursions specified in equations (6), (7), (8), (9), and (10). In calculating the planned receipts, $\tilde{Q}_t$, for this example, we have assumed a min-max order policy with $Q_{min}=Q_{max}=30$ for the retailers and $Q_{min}=Q_{max}=200$ for the warehouse.

Figure 3:
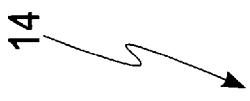

To continue with our example, let us assume that the DRP tables have been constructed for all three retailers following the DRP logic described above. The next step is to construct an analogous DRP table for the warehouse. To do this, DRP sums up the recommended order quantities by week from all three retailers and this becomes the weekly demand forecast used to drive the DRP logic at the warehouse level. That is, row 1 of the DRP table at the warehouse corresponding to the expected weekly demand at the warehouse is constructed by summing the corresponding recommended order quantities from the three retail DRP tables. Once the weekly demand is specified, the DRP recursive calculations are carried out exactly as for the retailers, resulting in a completed DRP table for the warehouse. FIG. 3, numeral 14, comprising Table 2 shows a completed DRP table for the warehouse in our example.

To summarize, the end result of the DRP calculations is a set of tables, one for each product and location in the distribution network. The key quantities that these tables contain are projections (equivalently, estimates) about the future on-hand inventory and replenishment requirements. While we have illustrated the construction of these tables using a simple example, the logic we have described carries over in a straightforward manner to much more complex networks.

Critique of DRP Logic

A primary criticism of DRP logic is that it ignores the variability of unknown future demand in its calculations by substituting the mean forecasted demand in the recursive equations. In our example, the mean demand at the retail level is 10 units per week and this is the number that is used in carrying out the DRP calculations. However, the standard deviation of demand is 6.06 and no where in the DRP logic is this fact used. The calculation of safety stock may make use of the standard deviation of demand but this calculation falls outside the scope of DRP logic. As stated earlier, the safety stock is assumed to be given as an input to the DRP calculations. In fact, the implicit assumption in DRP logic is that the standard deviation of demand is 0.

Another way to view the situation is that the formal recursive equations governing DRP logic as defined in (1), (2), (3), (4), and (5), are statements about random quantities. Viewed in this light, it is reasonable to ask if the DRP projections specified in equations (6), (7), (8), (9), and (10) correspond to the correct expected values of these random quantities. In fact, it is easy to prove mathematically that DRP logic does not provide correct estimates of these expected values. In this sense, DRP logic is faulty. As we shall demonstrate by numerical example, DRP logic can lead to performance projections which deviate significantly from the expected values. As a practical matter, we know of no way to predict in advance whether DRP logic will lead to "acceptable" performance projections in specific instances. As a result, the estimates provided by DRP logic are both unreliable and potentially misleading.

Two Methods For Improving DRP Projections

Both methods we describe in this section aim at refining the standard DRP projections by making use of information about future demand variability. Method 1 is based on analytical formulas, and is suitable for cases where the replenishment policy is lot-for-lot—i.e., there are no order size restrictions. Method 2 is simulation based, and is applicable more generally, including cases with order-quantity constraints, but does require greater computational effort.

In our example, recall that the future demand per week follows a discrete uniform distribution on [0,20] by assumption. Rather than treat this demand as deterministic with a value of 10 per week as DRP logic does, we incorporate in our methods the fact that the weekly demand has a standard deviation of 6.06. It is precisely this refinement that leads to greater accuracy in our performance estimates.

Method 1: An Improved Analytical Approximation

We describe an analytical approach to improving the DRP projections of on-hand inventory and replenishment requirements, assuming that the replenishment policy used is lot-for-lot. Specifically, we derive an alternative method for projecting the quantities $A_t$, $I_t$, $B_t$, and $R_t$ for a given product at a given location. To distinguish our method from standard DRP logic and from the formal equations described earlier, we will use the notation $\hat{A}_t$, $\hat{I}_t$, $\hat{B}_t$, and $\hat{R}_t$ to denote the results of our calculations. Note that because of our assumption of lot-for-lot replenishment, we do not distinguish in this section between the requirements and the planned receipts. (As explained earlier, under lot-for-lot replenishments, the planned receipts are identical to the requirements.)

Denote $$\mu_t := E[D_t], \quad \sigma_t := sd[D_t],$$

the mean and standard deviation of $D_t$; and denote, for s<t, $$D(s,t) = D_s + \cdots + D_t;$$

$$\mu(s,t) := E[D(s,t)], \quad \sigma(s,t) := sd[D(s,t)].$$

Recall that the lead time is L periods. Suppose we want to determine the requirement $A_t$ for period t. We need to make this decision at the beginning of period t−L, so as to place the order in time for it to arrive in period t.

Now, position ourselves at the beginning of period t−L. What we know are the following: (a) the net inventory left from the previous period, $Y_{t-L}$; (b) the replenishment requirements from previous periods, $A_{t-L}, A_{t-L'}, \ldots, A_{t-1}$, and (c) the scheduled receipts for this period, $T_{t-L}$. What we do not know is the sequence of demand over the lead time, $D_{t-L}, D_{t-L}+1, \ldots, D_t$. At this point, we make the assumption that demand per period follows a normal distribution and that each period's demand is independent of the demand in other periods. Then, we can write:

$$D(t-L,t) = \mu(t-L,t) + Z\sigma(t-L,t),$$

where Z is a standard normal random variable. (Standard indicates mean 0 and standard deviation 1.)

Denote $\hat{A}(s,t) := \hat{A}_s + \ldots + \hat{A}_t$, for s<t. We specify the requirements for period as t, $\hat{A}_t$, follows:

$$\hat{A}_t = [\mu(t-L,t) + K_t - \hat{Y}_{t-L} - \hat{A}(t-L, t-1)]^+. \quad (11)$$

In the above formula, whenever t≦L, we set t−L:=1; and when t−L>t−1, we set $\hat{A}(t-L,t-1)=0$. Denote $$k_t := \frac{\hat{Y}_{t-L} + \hat{A}(t-l, t-1) + \hat{A}_t - \mu(t-L, t)}{\sigma(t-L, t)} \quad (12)$$

as the safety factor. There are two cases. Suppose, first, that the quantity on the right hand side of (11) is positive. Then, $$\hat{Y}_{t-L} + \hat{A}(t-L, t-1) + \hat{A} = \mu(t-L,t) + K_t,$$

and hence, $$k_t = \frac{K_t}{\sigma(t-L, t)} \quad (13)$$

In this case, at the beginning of period t−L, the net inventory is $\hat{Y}_{t-L}$, which, along with the replenishment requirements over the lead time—a total of $$\hat{A}(t-L, t-1) + \hat{A}_t = \hat{A}(t-L, t)$$

is going to supply all the demands over the lead time—a total of D(t−L, t). Hence, at the end of period t, the expected backorder is:

$$\hat{B}_t = E[D(t-L, t) - \hat{Y}_{t-L} - \hat{A}(t-L, t)]^+ \quad (14)$$
$$= E[\mu(t-L, t) + Z \cdot \sigma(t-L, t) - \mu(t-L, t) - k_t \cdot \sigma(t-L, t)]^+$$
$$= \sigma(t-L, t)E[Z - k_t]^+.$$

Defining $G(x) := E[Z-x]^+$, we can rewrite (14) as $$B_t = \sigma(t-L,t) \cdot G(k_t). \quad (15)$$

Similarly, $$\hat{I}_t = E[\hat{Y}_{t-L} + \hat{A}(t-L,t) - D(t-L,t)]^+ \quad (16) \quad = \sigma(t-L,t)G(k_t).$$

where $H(x) := x + G(x)$.

Next, suppose $\hat{A}_t = 0$ in (11). Then, $$\hat{Y}_{t-L} + \hat{A}(t-L, t-1) \leq \mu(t-L,t) + K_t.$$

Hence, $$\hat{B}_t = E[\mu(t-L,t) + Z \cdot \sigma(t-L,t) - \hat{Y}_{t-L} - \hat{A}(t-L,t-1)]^+ = \sigma(t-L,t)G(k_t), \quad (17)$$

with $k_t$ following (12). Note in this case, the safety factor is at least as large as the safety factor is at least as large as the safety factor in (13) of the first case. Hence, $\hat{B}_t$ in (14) is no larger than $\hat{B}_t$ in (14), since G( ) is a decreasing function. (Intuitively, in the second case, since the available (net) inventory $\hat{Y}_{t-L}$ is higher, the effective safety factor is also higher; hence, the (projected) backorder is lower.)

Similarly, when $\hat{A}_t =$, we have $$\hat{I}_t = \sigma(t-L, t)H(k_t), \quad (18)$$

with $k_t$ following (12); and $\hat{I}_t$ in this case is higher than $\hat{I}_t$ of (16).

To summarize, we propose the following method for recursively calculating the quantities $\hat{A}_t$, $\hat{B}_t$ and $\hat{I}_t$, $t=1, \ldots, n$:

Method 1 for recursive calculation of $\hat{A}_t$, $\hat{B}_t$ and $\hat{I}_t$:

1. For t=1 to n:
   (a) Calculate $\hat{A}_t$ using (11);
   (b) Calculate $\hat{B}_t$ using (15, 17);
   (c) Calculate $\hat{I}_t$ using (16, 18);
   (d) Set $\hat{Q}_t = \hat{A}_t$;
2. End for loop.

After calculating $\hat{A}_t$, $t=1, \ldots, n$, we calculate the recommended order quantities, $\hat{R}_t$, following $$\hat{R}_t = \hat{A}_{t+L}, \quad t=L, \ldots, n-L.$$

Method 2: Monte Carlo Simulation

An alternative approach to estimate the quantities $E[A_t]$, $E[Q_t]$, $E[I_t]$, $E[B_t]$, and $E[R_t]$, $t=1, \ldots, n$, is to use the technique of Monte Carlo simulation. See Bratley, Fox, and Schrage (Bratley, P., Fox, B. L. and Schrage, L. E., *A Guide to Simulation*, Springer-Verlag, New York, 1987), Law and Kelton (Law, A. M. and Kelton, W. D., *Simulation Modeling & Analysis*, McGraw-Hill, Inc., New York, 1991), and Banks and Carson (Banks, J., Carson, J. S. and Nelson, B. L., *Discrete-Event System Simulation*, Prentice-Hall, New Jersey, 2nd edition, 1996) for details about this methodology. Essentially, this approach is statistical rather than analytical. It has the advantage over Method 1 of being applicable regardless of order quantity restrictions imposed by the user in calculating the planned receipts from the requirements. To implement this method, we make use of the same set of DRP recursions described in equations (1)–(5). However, rather than using the mean demand as the basis for our calculations, we use a set of randomly sampled demands.

For the purposes of describing the method, we assume for the moment that we have a set of M random samples of demand. Specifically, we assume that we have M sets of n numbers, $(d_1^m, \ldots, d_n^m)$, $m=1, \ldots, M$. The set $(d_1^m, \ldots, d_n^m)$ represents a random sample of demands for each period. For the $m^{th}$ set, calculate the quantities $a_t^m$, $b_t^m$, and $i_t^m$, recursively using the relations:

$$a_t^m = [b_{t-1}^m - i_{t-1}^m - T_t + d_t^m + K_t]^+ \quad t=1, \ldots, n, \quad (19)$$

$$q_t^m = f(a_t^m), \quad t=1, \ldots, n, \quad (20)$$

$$y_t^m = i_{t-1}^m - b_{t-1}^m + T_t, \quad t=1, \ldots, n, \quad (21)$$

$$i_t^m = [a_t^m + y_t^m - d_t^m]^+, \text{ and } b_t^m = [d_t^m - a_t^m - y_t^m]^+ \quad (22)$$

Then, our estimates, denoted $\bar{A}_t$, $\bar{Q}_t$, $\bar{I}_t$, and $\bar{B}_t$, are $$\bar{A}_t = \frac{1}{M}\sum_{m=1}^{M} a_t^m \quad t=1, \ldots, n \quad (23)$$

$$\bar{Q}_t = \frac{1}{M}\sum_{m=1}^{M} q_t^m \quad t=1, \ldots, n \quad (24)$$

$$\bar{I}_t = \frac{1}{M}\sum_{m=1}^{M} i_t^m \quad t=1, \ldots, n \quad (25)$$

$$\bar{B}_t = \frac{1}{M}\sum_{m=1}^{M} b_t^m \quad t=1, \ldots, n \quad (26)$$

To calculate the recommended order quantifies, $\bar{R}_t$, we use, as before, $$\bar{R}_t = \bar{Q}_{t+L}, \quad t=1, \ldots, n-L \quad (27)$$

To generate the sets of random samples, we make use of the fact that we are given the mean and standard deviation of the demand for each period. The first step requires selecting a probability distribution which matches the mean and standard deviation for each period. Then, to generate random samples from this probability distribution, we make use of any of several standard techniques (cf. Law and Kelton, Law, A. M. and Kelton, W. D., *Simulation Modeling & Analysis*, McGraw-Hill, Inc., New York, 1991), such as the inverse transform method.

As a final observation, we point out the generality of this method. For example, the method can be applied to situations in which demand is correlated across time or among different products. Also, the method can handle arbitrarily complex ordering rules—not just the lot-for-lot and min-max rules described earlier.

A Numerical Example

In this section, we use the example described above to compare results obtained using standard DRP logic (referred to as Standard DRP), to those obtained using the two methods that we have proposed (referred to as Method 1 and Method 2). For the purposes of this example, we focus on one of the three retailers and compare the estimates obtained for replenishment requirements, on-hand inventory, and backordered demand.

Figure 5:
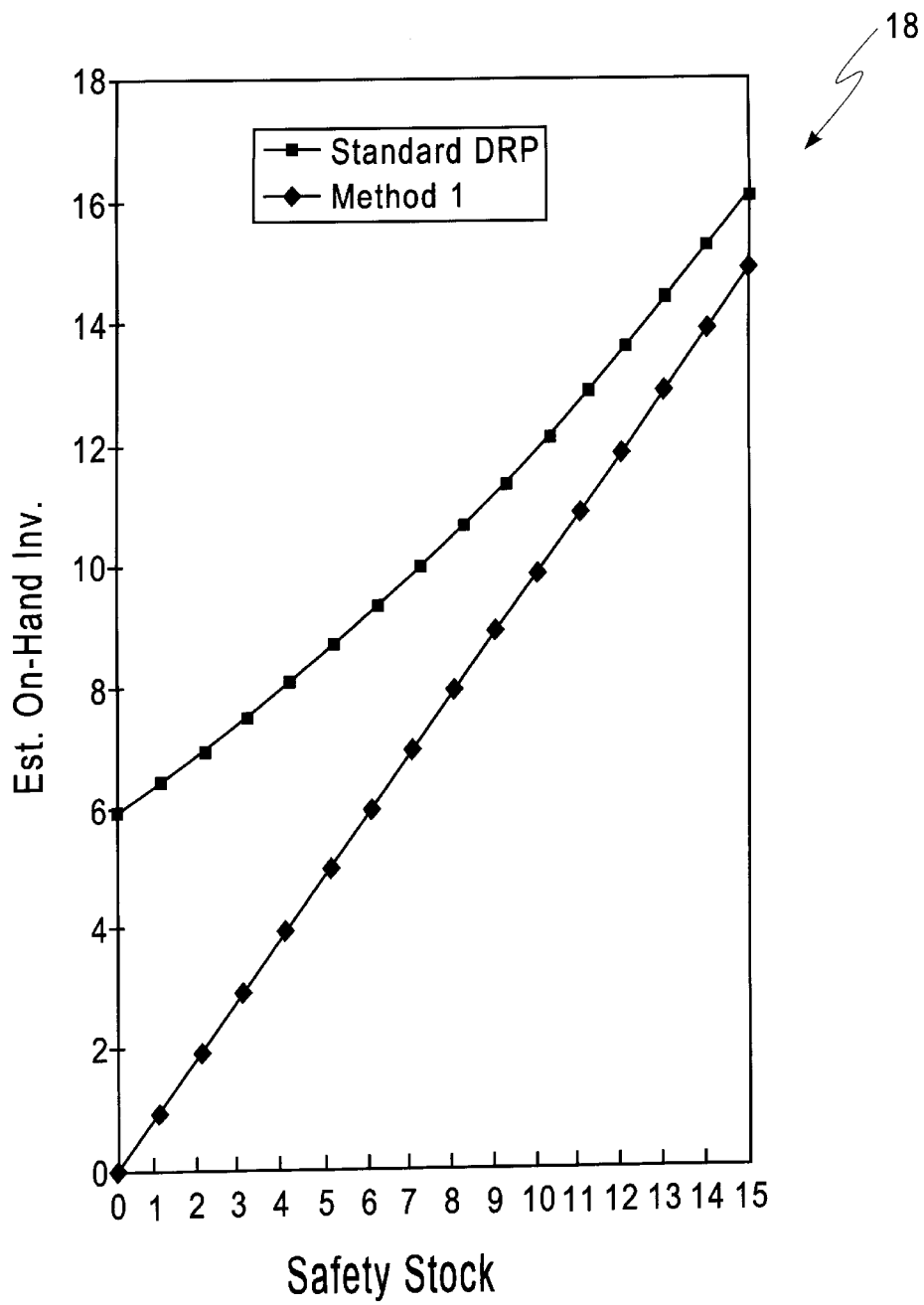
FIG. 5 is a graph in further illustration of an aspect of the present invention.

In our first comparison, we use a lot-for-lot replenishment rule to compare Standard DRP with Method 1. FIG. 4, numeral 16 comprising Table 3 contains DRP tables generated using both approaches. Note that the requirements generated for this example are nearly the same but the on-hand and back-ordered demand are quite different. Of particular significance is that the backordered demand is always estimated to be 0 using Standard DRP implying that the fill rate (i.e., the fraction of demand that is filled off the shelf) is 100% whereas Method 1 estimates the fill rate to be only 63% (1–3.75/10) in weeks 6–16. FIG. 5, numeral 18 compares estimates of on-hand inventory in period 10 as a function of the safety stock quantity. Observe that as the safety stock quantity decreases, the discrepancy between the estimates increases. When the safety stock is set to 0, the discrepancy amounts to more than half a week of demand.

In our second comparison, we use a min-max replenishment policy to compare Standard DRP with Method 2. We assume an order quantity of 30 at the retail level ($Q_{min} = Q_{max} = 3$). FIG. 6, numeral 20 comprising Table 4 displays the DRP tables generated using both methods. Here, there is a significant discrepancy not only in the estimates of on-hand inventory and backordered demand, but also in the estimates of planned receipts and recommended orders. Note also that the recommended order quantities as generated by Method 2 do not appear to respect the order quantity restriction. However, we emphasize that this estimate corresponds to an expected value, not an actual order quantity. Roughly, a recommended order of 10 in period 10 should be interpreted by the user as indicating that there is a ⅓ chance that an order of size 30 will be placed in at the start of period 10 and a ⅔ chance that no order will be placed. Keeping in mind that no actual orders are being placed except at the start of the current period, we see no difficulty in using these estimates within DRP.

Figure 7:
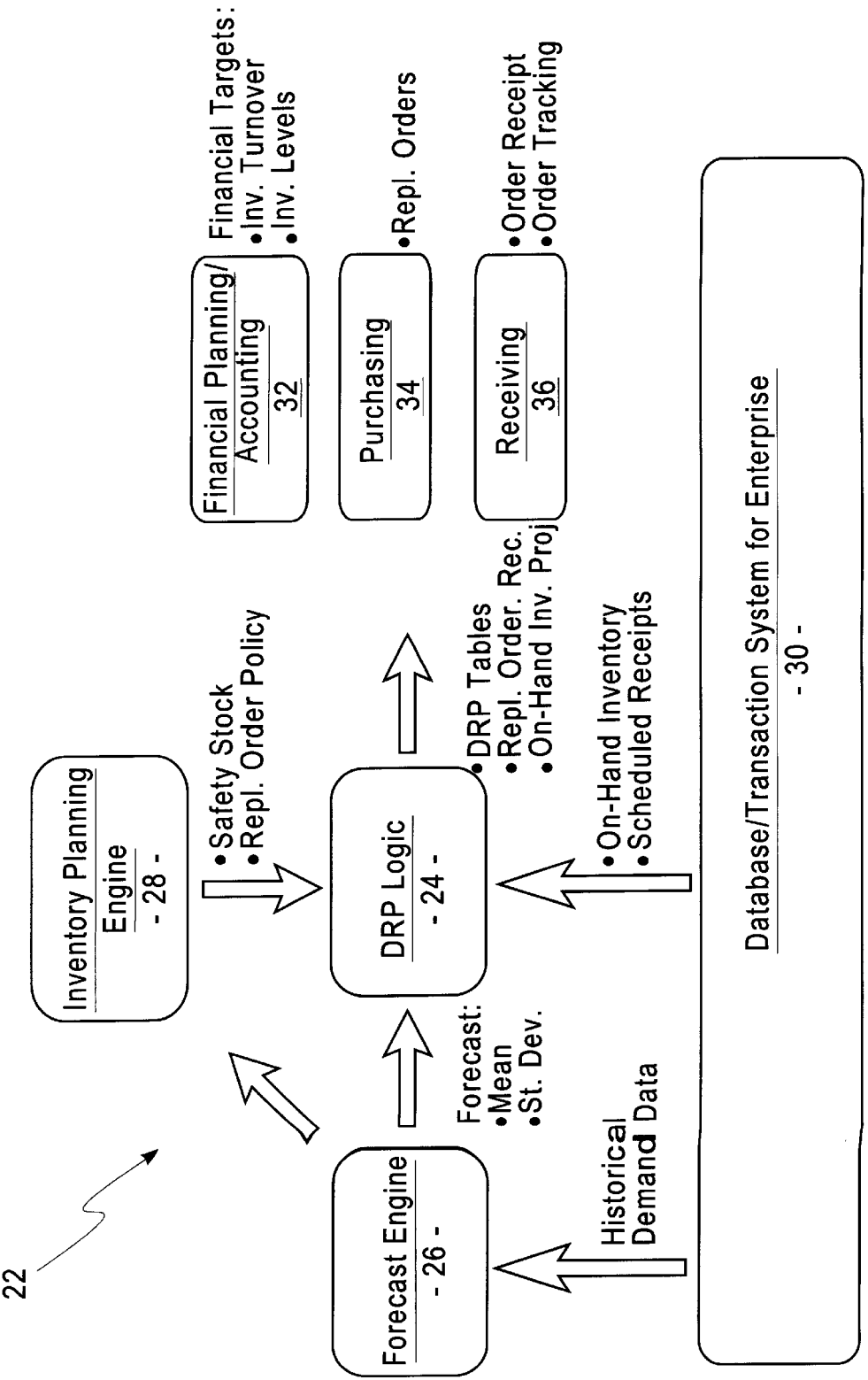
FIG. 7 provides a schematic of a DRP engine.

Attention is now directed to FIG. 7, which shows a DRP engine 22 of the kind summarized above. In particular, a DRP logic means 24 accepts inputs of the type shown from a forecast engine 26, an inventory planning engine 28, and a database 30. Outputs of the DRP logic means 24, in turn, include accounting 32, purchasing 34 and receiving 36 units. The DRP logic means 24 can execute the method of the present invention, for example, formatted in C+.

What is claimed:

1. A program storage device readable by a machine, tangibly embodying a program of instructions executable by the machine to perform a method for use in a physical distribution network, the method comprising:
    1) using a distribution resource planning (DRP) logic for providing estimates of at least one of projected future on-hand inventory and replenishment requirements;
    2) incorporating within the DRP logic an uncertainty of future demand for providing an estimate of at least one of future replenishment requirements and inventory levels in the physical distribution network; and
    3) controlling said at least one of said future replenishment requirements and inventory levels in said physical distribution network based on said estimate,
    wherein said future demand is correlated across one of time and among different products.

2. A device as in claim 1, wherein said using a DRP logic comprises using higher moment information in estimating at least one of future replenishment requirements and inventory levels in the physical distribution network.

3. A device according to claim 2, further comprising using the higher moment information as input to a Monte Carlo simulation technique for estimating at least one of future replenishment requirements and inventory levels in the physical distribution network.

4. A device according to claim 2, further comprising using the higher moment information as input to an analytical technique for estimating at least one of future replenishment requirements and inventory levels in the physical distribution network.

5. The device according to claim 1, wherein said estimating future on-hand inventory and future replenishment requirements is performed at all echelons of said distribution network.

6. The device according to claim 1, wherein said incorporating within the DRP logic said uncertainty of future demand includes considering variability of unknown future demand.

7. The device according to claim 3, wherein said replenishment is performed for cases with order-quantity constraints, such that there are order size restrictions.

8. The device according to claim 4, wherein said replenishment is performed lot-for-lot, such that there are no order size restrictions.

9. A distribution resource planning engine comprising:
    1) input means for inputting to the engine information derived from a database, a forecast engine, and an inventory planning engine and comprising respectively inventory status, planning parameters, and demand forecasts;
    2) logic means, connectable to the input means and operable upon said information derived from the database and comprising a distribution resource planning agent incorporating an uncertainty of future demand, for providing an estimate of at least one of future replenishment requirements and inventory levels in a physical distribution network;
    3) output means, connected to the logic means, for outputting estimates of at least one of future replenishment requirements and inventory levels in a physical distribution network, said at least one of said future replenishment requirements and inventory levels in said physical distribution network being controlled based on said estimate,
    wherein said future demand is correlated across one of time and among different products.

10. An engine according to claim 9, wherein the logic means generates estimates of future on-hand inventory levels, future backordered demand quantities, future and current recommended order quantities, and future replenishment requirements.

11. The engine according to claim 10, wherein said logic means generates said estimates at all echelons of said distribution network.

12. The engine according to claim 9, wherein said planning agent considers variability of unknown future demand.

13. The engine according to claim 9, wherein said replenishment is performed lot-for-lot, such that there are no order size restrictions.

14. The engine according to claim 9, wherein said replenishment is performed for cases with order-quantity constraints, such that there are order size restrictions.

15. A program storage device readable by a machine, tangibly embodying a program of instructions executable by the machine to perform a method for use in a physical distribution network, the method comprising:
    1) using a distribution resource planning (DRP) logic for providing estimates of at least one of projected future on-hand inventory and replenishment requirements;
    2) incorporating within the DRP logic an uncertainty of future demand for providing an estimate of at least one of future replenishment requirements and inventory levels in the physical distribution network; and
    3) controlling said at least one of said future replenishment requirements and inventory levels in said physical distribution network based on said estimate,
    wherein said future demand is treated non-deterministically such that demand for a predetermined time period has a standard deviation, and wherein demand per period is assumed to follow a normal distribution and each period's demand is independent of demand in other periods.

16. A program storage device readable by a machine, tangibly embodying a program of instructions executable by the machine to perform a method for use in a physical distribution network, the method comprising:
    1) using a distribution resource planning (DRP) logic for providing estimates of at least one of projected future on-hand inventory and replenishment requirements;
    2) incorporating within the DRP logic an uncertainty of future demand for providing an estimate of at least one of future replenishment requirements and inventory levels in the physical distribution network;
    3) controlling said at least one of said future replenishment requirements and inventory levels in said physical distribution network based on said estimate,
    wherein said using a DRP logic comprises using higher moment information in estimating at least one of future replenishment requirements and inventory levels in the physical distribution network; and 4) using said higher moment information as input to a Monte Carlo simulation technique for estimating at least one of future replenishment requirements and inventory levels in the physical distribution network, and wherein said estimating is based on a set of randomly sampled demands.

17. A program storage device readable by a machine, tangibly embodying a program of instructions executable by the machine to perform a method for use in a physical distribution network, the method comprising:

1) using a distribution resource planning (DRP) logic for providing estimates of at least one of projected future on-hand inventory and replenishment requirements;

2) incorporating within the DRP logic an uncertainty of future demand for providing an estimate of at least one of future replenishment requirements and inventory levels in the physical distribution network;

3) controlling said at least one of said future replenishment requirements and inventory levels in said physical distribution network based on said estimate, wherein said using a DRP logic comprises using higher moment information in providing an estimate of at least one of future replenishment requirements and inventory levels in the physical distribution network; and 4) using said higher moment information as input to an analytical technique for providing an estimate of at least one of future replenishment requirements and inventory levels in the physical distribution network, wherein a back-ordered demand is estimated as being any of zero (0) and a positive number such that fill rate is less than 100%, said fill rate being a fraction of demand that is filled by an on-hand, off-the-shelf quantity.

18. A distribution resource planning engine comprising:

1) input means for inputting to the engine information derived from a database, a forecast engine, and an inventory planning engine and comprising respectively inventory status, planning parameters, and demand forecasts;

2) logic means, connected to the input means and operable upon its information and comprising a distribution resource planning agent incorporating an uncertainty of future demand, for providing an estimate of at least one of future replenishment requirements and inventory levels in a physical distribution network; and 3) output means, connected to the logic means, for outputting estimates of at least one of future replenishment requirements and inventory levels in a physical distribution network, said at least one of said future replenishment requirements and inventory levels in said physical distribution network being controlled based on said estimate, wherein said future demand is treated non-deterministically such that demand for a predetermined time period has a standard deviation, wherein demand per period is assumed to follow a normal distribution and each period's demand is independent of demand in other periods, wherein a set of randomly sampled demands is used as a basis for said estimating by said logic means, and said demand is correlated across one of time and among different products, a back-ordered demand being estimated as any of zero (0) and a positive number such that fill rate is less than 100%, said fill rate being a fraction of demand that is filled by an on-hand, off-the-shelf quantity.

19. A method of estimating future replenishment requirements and inventory levels in a physical distribution network, comprising:

1) using a distribution resource planning (DRP) logic for providing estimates of at least one of projected future on-hand inventory and replenishment requirements;

2) incorporating within the DRP logic an uncertainty of future demand for providing an estimate of at least one of future replenishment requirements and inventory levels in the physical distribution networks; and 3) controlling said at least one of said future replenishment requirements and inventory levels in said physical distribution network based on said estimate, wherein said future demand is correlated across one of time and among different products.

* * * * *